United States Patent
Ragusa et al.

(10) Patent No.: US 11,055,590 B2
(45) Date of Patent: Jul. 6, 2021

(54) MULTIRESOLUTION OPTICAL CODE

(71) Applicant: International Business Machines Corporation, Armonk, NY (US)

(72) Inventors: Roberto Ragusa, Rome (IT); Marco Imperia, Rome (IT); Antonio Bagarolo, Marcianise (IT); Alice Guidotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/573,177

(22) Filed: Sep. 17, 2019

(65) Prior Publication Data

US 2021/0081736 A1    Mar. 18, 2021

(51) Int. Cl.
*G06K 19/06* (2006.01)
*G06K 7/10* (2006.01)
*G06K 7/14* (2006.01)

(52) U.S. Cl.
CPC ... *G06K 19/06037* (2013.01); *G06K 7/10722* (2013.01); *G06K 7/1417* (2013.01); *G06K 7/1434* (2013.01); *G06K 19/06056* (2013.01); *G06K 19/06178* (2013.01)

(58) Field of Classification Search
USPC .............................. 235/462.01, 494, 462.09
See application file for complete search history.

(56) References Cited

U.S. PATENT DOCUMENTS

| | | | | |
|---|---|---|---|---|
| 6,198,847 | B1* | 3/2001 | Washizawa | G06K 9/209 382/181 |
| 6,622,923 | B1* | 9/2003 | Walmsley | G06K 1/121 235/462.01 |
| 8,948,445 | B2 | 2/2015 | Mow et al. | |
| 9,070,033 | B2 | 6/2015 | Nakamura | |
| 2004/0184772 | A1* | 9/2004 | Kakii | H04N 19/88 386/258 |
| 2007/0143737 | A1* | 6/2007 | Huang | G06K 7/14 717/103 |
| 2012/0256007 | A1 | 10/2012 | Cok | |
| 2015/0339508 | A1* | 11/2015 | Hosokane | G06K 19/06103 235/462.09 |
| 2017/0243097 | A1* | 8/2017 | Loy | G06K 19/06037 |
| 2018/0197053 | A1 | 7/2018 | Picard et al. | |

OTHER PUBLICATIONS

Wikipedia, "Barcode—Wikipedia," https://en.wikipedia.org/wiki/Barcode#Matrix_(2D)_barcodes, printd Jun. 26, 2019, 17 pgs.

* cited by examiner

*Primary Examiner* — Tuyen K Vo
(74) *Attorney, Agent, or Firm* — Robert J. Shatto (57) ABSTRACT

A multiresolution optical code can be encoded. A first set of information and a second set of information to encode in an optical code is received. An optical code that encodes the first set of information in a plurality of dots is generated. Each dot of the plurality of dots is divided into a matrix of a first number of sub-dots by a second number of sub-dots, wherein each of the first number and the second number are integers equal to or greater than three and wherein this dividing creates a set of matrices of sub-dots. The second set of information is encoded in a plurality of the sub-dots of the set of matrices of sub-dots.

20 Claims, 6 Drawing Sheets

MULTIRESOLUTION OPTICAL CODE

BACKGROUND

The present disclosure relates to optical code, and more specifically, to optical codes with multiple levels of encoded material.

Barcodes are an example of optical codes in one dimension with a series of lines representing a series of numbers. A scanner can read these lines and determine the numbers to which they correspond. Similarly, a QR Code® (Quick Response code) is a bidimensional optical code with a matrix of dots in two dimensions, representing encoded data. Typically, one of four standardized encoding modes (i.e., numeric, alphanumeric, byte/binary, or kanji) can be used to store data in a QR code. A picture of a QR code can be taken and the image analyzed to determine the information encoded into the QR code.

SUMMARY

According to embodiments of the present disclosure, a multiresolution optical code can be encoded using the following method. A first set of information and a second set of information to encode in an optical code is received. An optical code that encodes the first set of information in a plurality of dots is generated. Each dot of the plurality of dots is divided into a matrix of a first number of sub-dots by a second number of sub-dots, wherein each of the first number and the second number are integers equal to or greater than three and wherein this dividing creates a set of matrices of sub-dots. The second set of information is encoded in a plurality of the sub-dots of the set of matrices of sub-dots.

According to various embodiments described herein, a system may be provided comprising a memory and a processor for implementing the above-described method operations. Furthermore, various embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or devices described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to optical code, and more particular aspects relate to optical codes with multiple levels of encoded material. While the present disclosure is not necessarily limited to such applications, various aspects of the disclosure may be appreciated through a discussion of various examples using this context.

A QR code (Quick Response code) is a bidimensional optical code with a matrix of dots in two dimensions, representing encoded data. In many cases, a QR code consists of a series of black and white dots arranged in a two-dimensional array. The black or white color in specific positions is used to embed bits of information. Typically, one of four standardized encoding modes (numeric, alphanumeric, byte/binary, or kanji) can be used to store data in a QR code.

The amount of information embeddable (or payload) in a QR code (or other matrix optical) is related to the total number of dots; for example, a square QR code of side N number of dots contains a total N*N dots. However, the amount of payload is actually lower than N*N because of the need for fixed references (for example, many QR codes have three black squares each with a white border and a black border around that, in three of the corners of the QR code, such as in FIGS. 1, 3A, 3B, 4A, and 4B discussed below), and due to the inclusion of error correcting codes. In a standard QR code, if additional payload is to be encoded, a larger QR code than with sides of size N is required. This can be accomplished with a physically larger QR code (e.g., 3 inches by 3 inches instead of 2 inches by 2 inches) or with the dots in the QR code being smaller. However, once N is too large, an observer or device capturing the code becomes unable to properly decode the QR code, because the dots are not individually distinguishable anymore. In particular, large codes may create problems for cameras that have low resolution or are too distant from the code. In such case, a QR code becomes unreadable and no information can be decoded. A compromise between amount of payload and robustness against adverse decoding conditions must be made.

As described herein, an optical code can be designed so as to permit decoding of a partial payload in adverse observing conditions (e.g., poor resolution camera, bad lighting conditions, large distance between code and observer), and a full decoding when good captured image quality of the optical code is available. As such, a code can embed more than one payload, with a smaller or more basic one decodable even with very bad image quality and an additional, second payload, which can be decoded with a greater quality image. More than two levels of encoding is also possible. For example, there could be a first, basic level which could be decoded with a distant or low resolution camera, a second level for a closer or higher resolution camera (which could decode both the first and second levels), a third level for a high resolution scanner or other device with sufficient resolution (which could decode the first, second, and third levels), etc. The number of levels of encoding would only be limited in the ability of a printer or other device used for generating the code to accurately create dots of two or more colors (e.g., black and white), and with the decoding by camera or other device being a practical limit on the number of useable levels of encoding.

Creation of such a multiresolution optical code can be performed after receiving information to encode within an optical code, including the information to be included in the first level, the second level, and any additional levels. The first level optical code can be generated using known techniques such as generating a QR code and can include reference dots and error correcting dots. Then, each dot of the first level optical code can be divided into an A by B matrix of sub-dots, where A and B are numbers of sub-dots (e.g., a 5 by 5 matrix of sub-dots or a 4 by 6 matrix of sub-dots). The border of each dot can be broken down into a series of pairs of sub-dots (e.g., the 16 sub-dots around a core of 9 center dots in a 5 by 5 matrix of sub-dots can comprise the border of a dot, and the 16 sub-dots can be grouped into 8 pairs of sub-dots). Pairs of these sub-dots can be identified, starting from a starting position (such as the upper left corner of the matrix). Second level data can be encoded into these pairs of sub-dots by changing one of the sub-dots of each pair into a white sub-dot or a black sub-dot. For example, encoding a 0 can be performed by using a black sub-dot followed by a white sub-dot and a 1 can be encoded using a white sub-dot followed by a black sub-dot (or vice versa). In this way, additional bits of information can be stored in a black dot by changing half of the sub-dots in the border of the black dot to white sub-dots, and additional information can be stored in a white dot by changing half of the sub-dots in the border of the white dot to black sub-dots. This process can be repeated by further dividing each sub-dot into a C by D matrix of sub-dots, identifying pairs of sub-dots on the border of the matrix, and encoding third level data in the pairs of sub-dots of the sub-dots. Decoding of each level of the optical code can be performed using different levels of low pass filters for each level of information to be decoded.

Multiresolution optical codes (including methods of creating and decoding, and systems and computer products for doing so) as described herein can provide advantages over prior optical codes, including QR codes and barcodes. As disclosed herein, significantly more data can be encoded within an optical code of the same dimension as a prior art optical code, without lowering the size of the dots so as they are not individually distinguishable. Cameras or other devices with sufficient resolution can decode the additional level(s) of payload and cameras or other devices with insufficient resolution can still decode the original payload. These improvements and/or advantages are a non-exhaustive list of example advantages. Embodiments of the present disclosure exist which can contain none, some, or all of the aforementioned advantages and/or improvements.

While the present disclosure discusses primarily QR codes as the type of optical code being improved by the teachings presented herein, the teachings of this disclosure should not be limited to QR codes but may be implemented in other types of optical code, particularly those using dots in two or more colors such that they can be adjusted using the teachings presented herein to encode additional information in each dot. Additionally, while black and white dots are the colors most often discussed herein, this disclosure is not limited to these colors. Other colors having sufficient contrast such that they can be distinguished from one another can be used. This can involve using a light color and a dark color.

Figure 1:
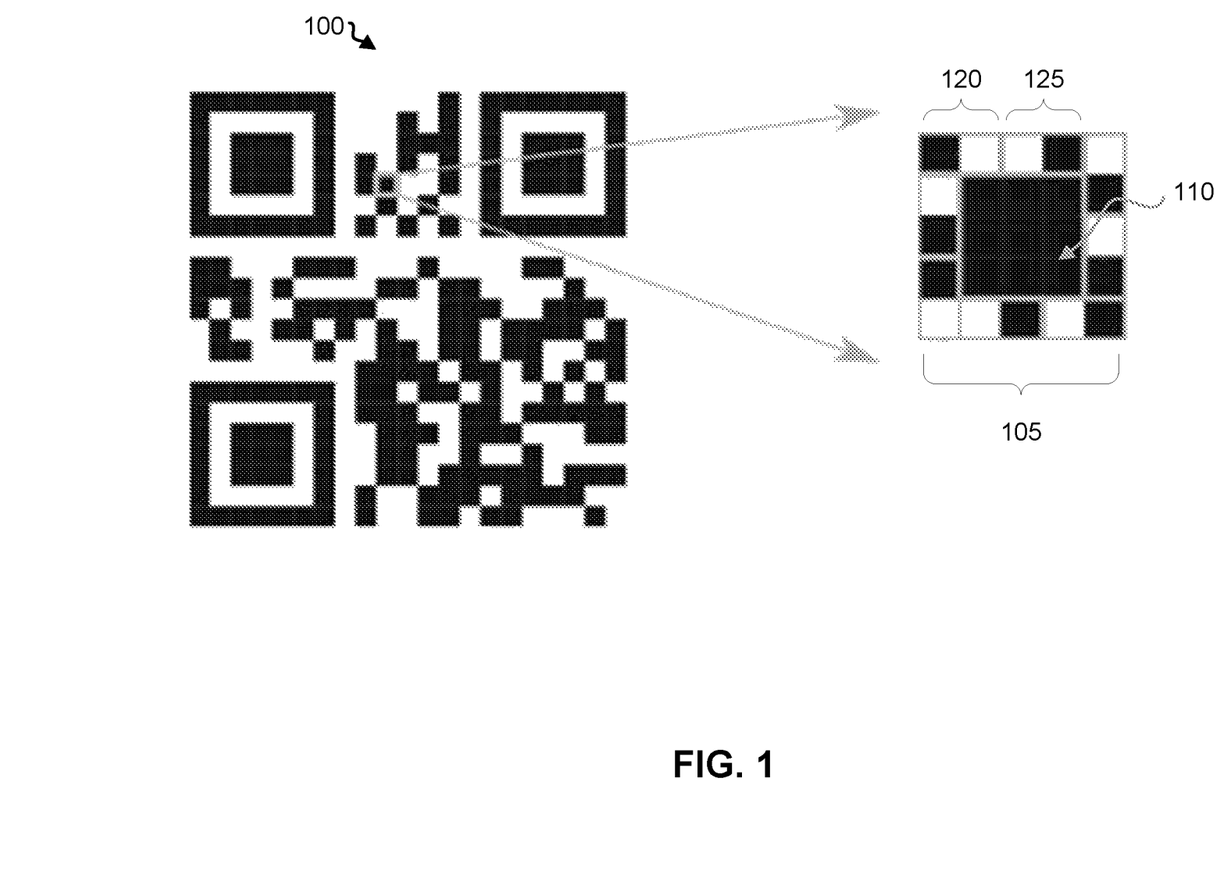
FIG. 1 depicts an example optical code with an exploded view of a second level of encoding, in accordance with embodiments of the present disclosure.

FIG. 1 depicts an example QR code 100 with an exploded view of a second level of encoding, in accordance with embodiments of the present disclosure. Example QR code 100 is provided for example purposes only and many features of example QR code 100 can be changed and still be used in embodiments of the present disclosure. This includes changing the size of example QR code 100 (whether physically or by number of dots), the colors of dots used, the arrangement of dots (which is necessary to encode different strings or other types of information), and other features as appropriate.

Example QR code 100 encodes the string "basic content." Example QR code 100 has a size of 21 dots by 21 dots, for a total of 441 dots. Many of these 441 dots are used for decoding reference, including the 3 squares in the lower left, upper left, and upper right corners. The payload size of example QR code 100 is 104 bits (or 13 bytes), which corresponds to the string "basic content."

The exploded view 105 of one of the black dots of example QR code 100 demonstrates application of the teachings of the present disclosure to encode additional information into an optical code. In exploded view 105, a dot is transformed into a 5 by 5 matrix of sub-dots. In exploded view 105, center region 110 is the center 3 by 3 sub-dots (9 sub-dots) of the 5 by 5 matrix. Center region 110 is unchanged when encoding additional payload into example QR code 100. By leaving center region 110 unchanged, the original color of the dot remains in the center of the dot, and even when half of the remaining dots are changed, the majority of the dot is not. This also serves to keep the barycenter of the dot in approximately the same spot. The remainder of exploded view 105 consists of 16 sub-dots, which are grouped into 8 pairs of sub-dots, including sub-dot pair 120 and sub-dot pair 125. Each pair of sub-dots (including 120 and 125) comprise one black dot and one white dot. In some embodiments, sub-dot pair 120, which consists of a black dot followed by a white dot (when reading clockwise around exploded view 105), can correspond to a binary bit of 0 and sub-dot pair 125, which consists of a white dot followed by a black dot (when reading clockwise around exploded view 105), can correspond to a binary bit of 1. When starting from the upper left corner of exploded view 105 and reading clockwise around the border of exploded view 105, the 8 pairs of sub-dots encodes the string "01110010" in binary bits. In this way, each of the 441 dots of example QR code 100 can encode an additional 8 bits of information, for a total additional payload of 3528 bits.

In some embodiments, a different starting position, direction of reading, or other value assigned to the pairs of sub-dots can be used, so long as a decoder has access to the method used for encoding the optical code. In some embodiments, a matrix of a size different than a 5 by 5 matrix can be used. For example, in some embodiments, a 6 by 6 matrix can be used, with a center of 4 by 4 sub-dots, 20 sub-dots in the border of the matrix, and thus 10 sub-dot pairs in which additional information can be encoded. In some embodiments, matrices of sub-dots can be used with differing side lengths (e.g., a 5 by 6 matrix with a center of 3 by 5 sub-dots, and so forth). Matrices of sub-dots with differing side lengths may be practical, for example, where the dots are rectangular instead of square.

Figure 2:
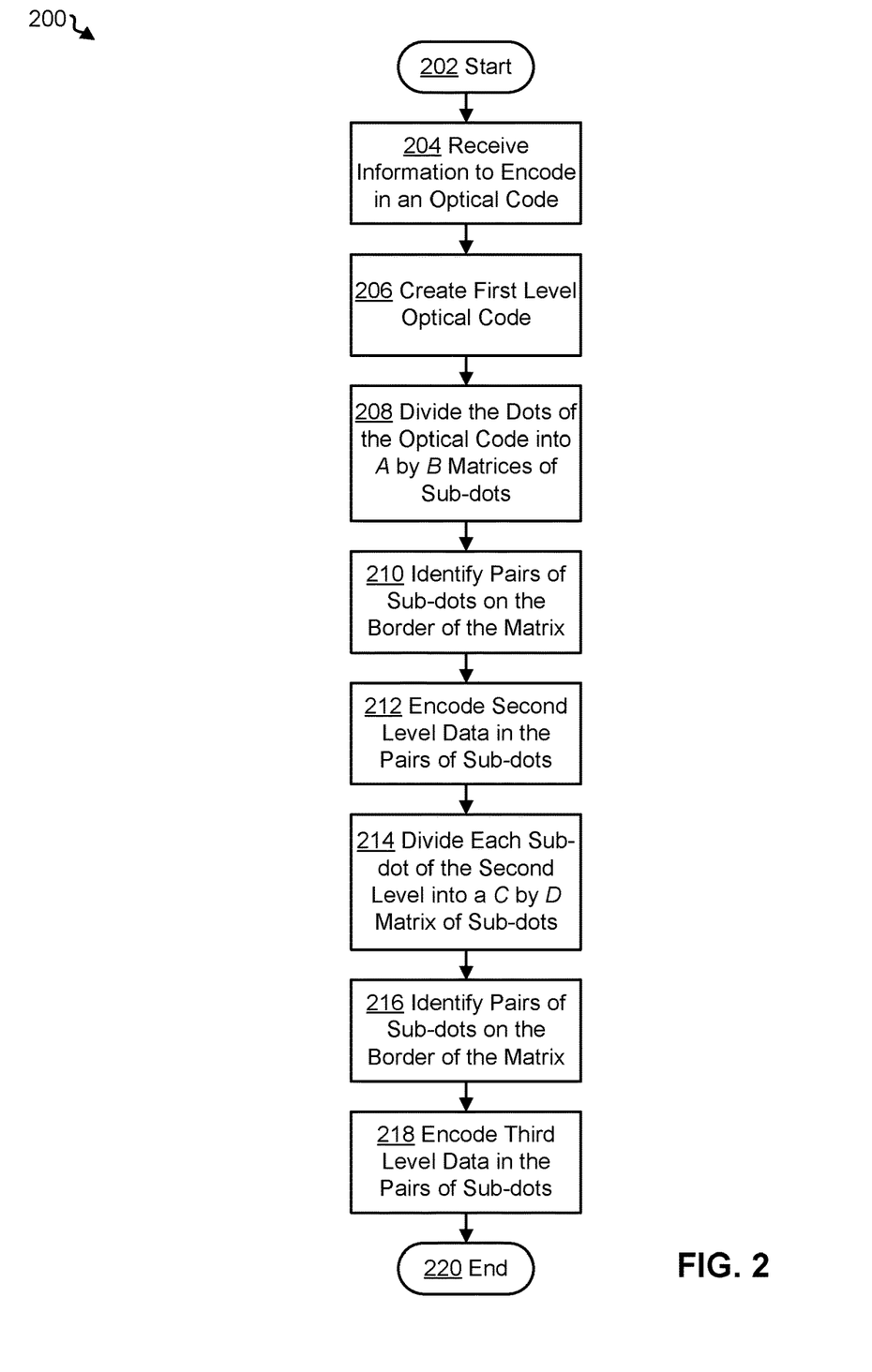
FIG. 2 depicts an example method for encoding a multiresolution optical code, in accordance with embodiments of the present disclosure.

FIG. 2 depicts an example method 200 for encoding a multiresolution optical code, in accordance with embodiments of the present disclosure. Method 200 can include more or fewer operations than those depicted. Method 200 can include operations in different orders than those depicted. In some embodiments, method 200 can be performed using a computer system (such as computer system 600 depicted in FIG. 6) running an optical code application.

Method 200 begins at operation 202 and proceeds to operation 204. At operation 204, information to encode in an optical code is received. This information can include information to encode in two or more levels of encoding, such that the information to be encoded in a first level of encoding is information which an optical code scanner, camera, or other device can decode even in poor conditions (e.g., low resolution, far distance between device and code). This information to be encoded in the first level of encoding can be the most important information to be transmitted through the code, the beginning of the information, or information otherwise chosen for encoding in the first level. The information to include in a second or further level of encoding can be additional or supplementary information which can be decoded by an optical code scanner, camera, or other device can decode in better conditions (e.g., higher resolution, lower distance between device and code). This information can be in a format used for encoding optical codes, such as numeric, alphanumeric, byte/binary, kanji, or other type of information, or be converted into such format.

At operation 206, an optical code can be created using the first level information received in operation 204. This can be performed using any known techniques for generating an optical code, including techniques for generating a QR code, such as example QR code 100 of FIG. 1.

At operation 208, the dots of the optical code generated at 206 are divided into A by B matrices of sub-dots. In some embodiments, this can be performed for each dot of the optical code, while in other embodiments, a smaller number of dots can be divided (which may occur when a smaller payload is needed or in order to leave reference dots unchanged). In some embodiments, A and B can be the same number of sub-dots, while in other embodiments, such as if the dots are not square, A and B can be different numbers of sub-dots. In order for each dot to have sufficient number of dots such that there is a center region of sub-dots and a border of sub-dots around the center region, each of A and B must be equal to or greater than 3. The larger A and B are, the larger the center region of the matrices can be, such that the original color of the dot can be more easily identified, but larger numbers of A and B will require a greater resolution image of the optical code for successful decoding (in order to individually distinguish the sub-dots of the A by B matrices of sub-dots). In the example of FIG. 1 above, A and B were each 5, and dividing dots into a matrix of sub-dots was into a 5 by 5 matrix. At this point in method 200, all of the sub-dots of a given dot are the same color as the original dot.

At operation 210, pairs of sub-dots on the border of the matrix are identified. A matrix of A by B sub-dots will have a center region of A-1 by B-1 sub-dots and the remaining sub-dots around this center region will be the border of the matrix. Pairs of these sub-dots can be identified by taking a starting point, such as the upper left corner of a dot, and identifying pairs of sub-dots around the border in either a clockwise or counterclockwise fashion. In the example of FIG. 1, the upper left corner was chosen, and sub-dot pairs were identified starting with sub-dot pair 120 and sub-dot pair 125.

At operation 212, the second level data is encoded in the pairs of sub-dots. This can occur by changing one sub-dot of each pair of sub-dots to a different color. For example, if a dot in the first level optical code created at 206 is a black dot, which has been divided into a matrix of A by B black sub-dots in operation 208, then one sub-dot of each pair of sub-dots of this black dot is changed to a white (or other contrasting color) dot. In some embodiments, a sub-dot pair which consists of a black dot followed by a white dot (when reading clockwise around the border), can correspond to a bit of 0, and a sub-dot pair which consists of a white dot followed by a black dot (when reading clockwise around the border), can correspond to a bit of 1. In other embodiments the reverse can be true. As such, to encode the second level data into the pairs of sub-dots, one sub-dot of each pair of sub-dots can be changed such that the pair of sub-dots represents either a 0 or a 1, according to the information to be encoded. Each dot can have its sub-dots changed to encode this additional second-level information. The second-level information can be encoded, for example, starting with the upper left dot in the optical code, proceeding to the right until the end of the row, and repeated for each row of dots. Many other starting points or directions of encoding information into the sub-dots of each dot can be used. In this way, a decoder can later "read" these dots and their sub-dots to decode the second-level information. In some embodiments, error correcting codes can be included in the second level code, lowering the additional payload which can be deployed while increasing the accuracy of decoding.

When encoding this second level information into each dot by changing one sub-dot of each pair of sub-dots, the center region of each dot is unchanged. Additionally, half of the sub-dots remains unchanged, as only one sub-dot of each pair of sub-dots is changed. As such, the majority of a dot remains unchanged. For example, using a matrix of 5 by 5 dots, the 9 center dots will remain unchanged and 8 of the 16 sub-dots in the border will remain unchanged. As such, 17 of the original 25 sub-dots (68%) will be the same color as the dot originally was, and 8 of the 25 sub-dots (32%) will be a different color. In another example, using a matrix of 6 by 6 dots, the 16 center dots will remain unchanged and 10 of the 20 sub-dots in the border will remain unchanged. As such, 26 of the original 36 sub-dots (approximately 72%) will be the same color as the dot originally was, and 10 of the 36 sub-dots (approximately 28%) will be a different color. These numbers and percentages of sub-dots remaining unchanged and being changed are the same regardless of what information is being encoded in the optical code. Because the center remains unchanged and the half of the border remains unchanged, the barycenter of each dot is almost perfectly in the center of the original dot. Because of these properties (the altered dot remaining mostly the same color and having a center in nearly the same spot as the original), decoding of the original dot can still occur, in addition to decoding the information stored in the second level.

At operation 214, each sub-dot of the second level optical code produced in operation 212 is divided into a C by D matrix of sub-dots. In some embodiments, operations 214-218 will not be used (e.g., if there is no third level data received in operation 204, there is no need for further dividing and encoding). Dividing each sub-dot of the second level optical code produced in operation 212 is divided into a C by D matrix of sub-dots can proceed in a similar fashion as that performed above in operation 208 of dividing the original dots. In some embodiments, C and D can be the same numbers as A and B, while in other embodiments, different numbers of sub-dots can be used. In order for each dot to have sufficient number of dots such that there is a center region of sub-dots and a border of sub-dots around the center region, each of C and D must be equal to or greater than 3. At this stage of method 200, each sub-dot in the C by D matrix of sub-dots is the same color as the sub-dot being further divided.

At operation 216, pairs of sub-dots on the border of the matrix are identified. This can proceed in a similar fashion as at operation 210. A matrix of C by D sub-dots will have a center region of C-1 by D-1 sub-dots and the remaining sub-dots around this center region will be the border of the matrix. Pairs of these sub-dots can be identified by taking a starting point, such as the upper left corner of a sub-dot, and identifying pairs of sub-dots around the border in either a clockwise or counterclockwise fashion.

At operation 218, third level data is encoded in the pairs of sub-dots in the border of the C by D matrix. This can proceed similarly to operation 212 for the second level data. This can occur by changing one sub-dot of each pair of sub-dots to a different color. For example, if a sub-dot in the second level optical code created at 212 is a black sub-dot, which has been divided into a matrix of C by D black sub-dots in operation 214, then one sub-dot of each pair of sub-dots of this black sub-dot is changed to a white (or other contrasting color) sub-dot.

When encoding this third level information into each dot by changing one sub-dot of each pair of sub-dots, the center region of each sub-dot is unchanged. Additionally, half of the sub-dots of the sub-dots remain unchanged, as only one sub-dot of each pair of sub-dots is changed. As such, the majority of a sub-dot from the second level remains unchanged. For example, using a matrix of 5 by 5 dots, the 9 center sub-dots will remain unchanged and 8 of the 16 sub-dots in the border will remain unchanged. As such, 17 of the original 25 sub-dots (68%) will be the same color as the dot originally was, and 8 of the 25 sub-dots (32%) will be a different color. However, an original dot from the first level will be further reduced in percentage of original color by this effect. This is because each of the sub-dots, including the sub-dots in the center area at the second level, are divided into sub-dots again, each again having half of their border sub-dots being changed to a different color. In a 5 by 5 matrix example further divided into 5 by 5 matrices (for a total of 625 sub-dots at the third level), this additional reduction means an originally black dot will be comprised of 353 black sub-dots and 272 white sub-dots, for percentages of approximately 56.5% black and 43.5% white. These numbers and percentages of sub-dots remaining unchanged and being changed are the same regardless of what information is being encoded in the optical code. As above, the barycenter of each dot is almost perfectly in the center of the original dot. Because of these properties (the altered dot remaining mostly the same color and having a center in nearly the same spot as the original), decoding of the original dot can still occur, in addition to decoding the information stored in the second level and the second level.

In some embodiments, more than three levels of data can be encoded and operations 214 through 218 can be repeated as many times as desired. After the last level of data is encoded, method 200 ends at 220.

Figure 3A:
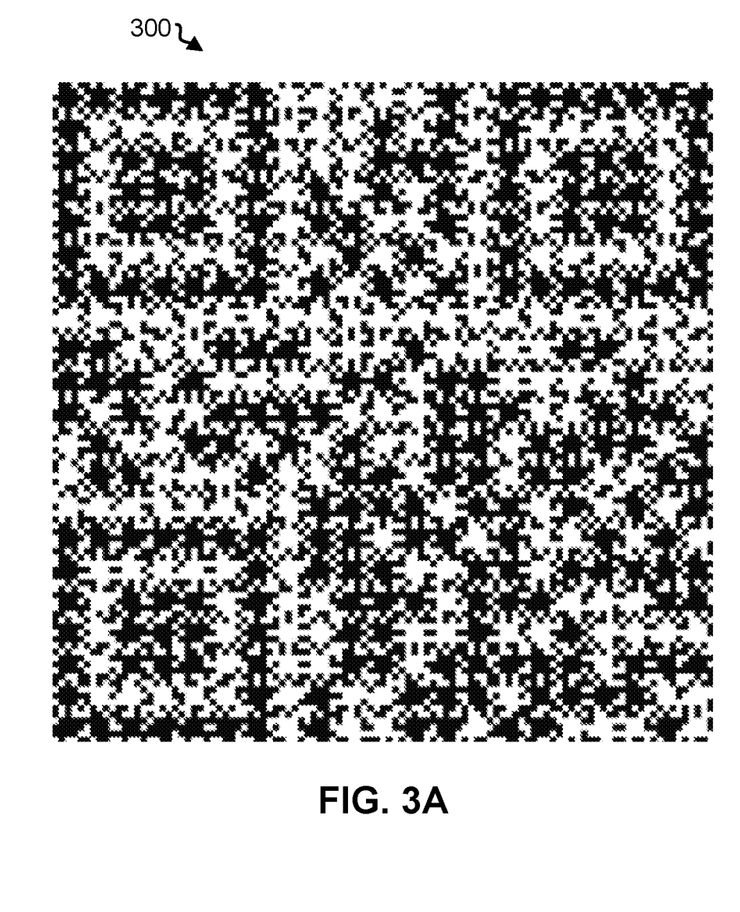
FIG. 3A depicts an example multiresolution optical code with two levels of resolution, in accordance with embodiments of the present disclosure.

FIG. 3A depicts an example multiresolution optical code 300 with two levels of resolution, in accordance with embodiments of the present disclosure. Multiresolution optical code 300 is the example QR code 100 from FIG. 1 (which encodes the string "basic content") with a second level of data encoded into each dot of example QR code 100. As presented here, the second level data encoded into multiresolution optical code 300 is a series of random 0s and 1s encoded into 5 by 5 matrices of sub-dots for each dot and is provided for example purposes only. As can be seen from a comparison of multiresolution optical code 300 and example QR code 100, multiresolution optical code 300 is visually similar to example QR code 100, especially if viewed from a distance; however, one can also see that there is a significant amount of additional detail, that being sub-dots on the borders of the original dots. Multiresolution optical code 300 can be obtained from example QR code 100 by performing method 200 of FIG. 2 using the series of random 0s and 1s as the second level data to be encoded and with A and B each being 5 for a 5 by 5 matrix of sub-dots for each dot.

As noted above, example QR code 100 has a size of 21 dots by 21 dots, for a total of 441 dots and the payload size of example QR code 100 is 104 bits (or 13 bytes), which corresponds to the string "basic content." Because multiresolution optical code 300 was created using a 5 by 5 matrix of sub-dots for each dot, each dot contains 8 pairs of sub-dots along its border. As such, each of the 441 dots now encodes an additional 8 bits of information. Thus, in addition to the original payload "basic content" of 104 bits, multiresolution optical code 300 also contains 3528 bits of additional information. Because no reference bits were included in the second level information, this example multiresolution optical code 300 can store nearly 35 times as much information as that stored in example QR code 100. In some embodiments, error correcting codes can be included in the second level code, lowering the additional payload which can be deployed while increasing the accuracy of decoding. Full decoding of multiresolution optical code 300 (both the first level data and second level data) can occur if an image can be obtained with 5 times the minimum resolution required to decode the original example QR code 100 (so as to be able to individually distinguish each sub-dot of the 5 by 5 matrices).

Figure 3B:
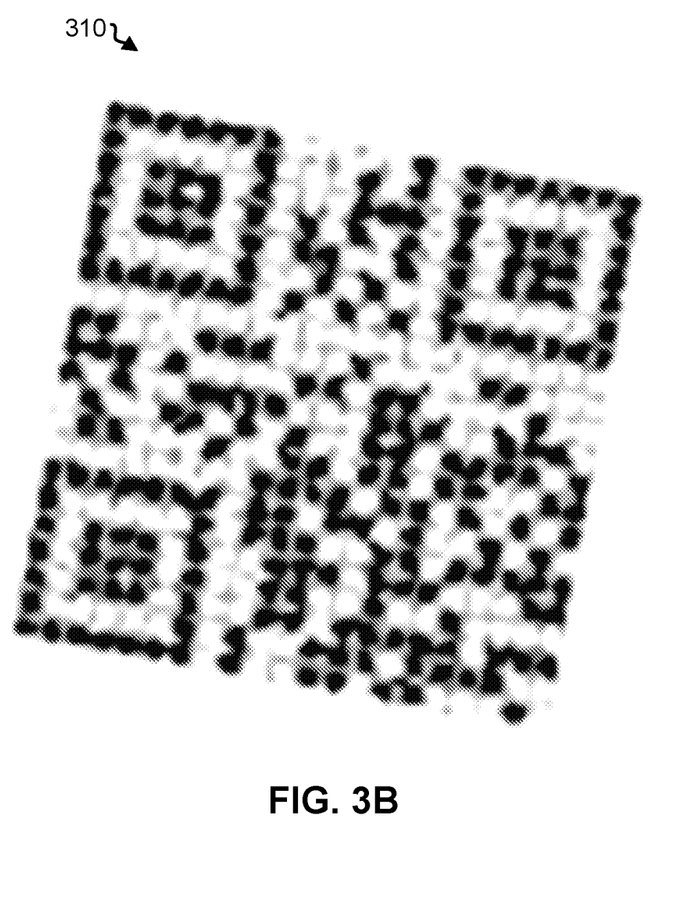
FIG. 3B depicts an example multiresolution optical code with two levels of resolution after image adjustments have been applied, in accordance with embodiments of the present disclosure.

FIG. 3B depicts an example multiresolution optical code 310 with two levels of resolution after image adjustments have been applied, in accordance with embodiments of the present disclosure. Because of the additional white sub-dots in previously black dots and black sub-dots in previously white dots, multiresolution optical code 300 of FIG. 3A has extra unexpected white-black edges compared to example QR code 100 of FIG. 1. Additionally, the lowering of the black content of the black dots (to 68% black and 32% white) and the white content of the white dots (to 68% white and 32% black), the black dots can appear dark grey and the white dots can appear light grey. In order to decode the first level content of multiresolution optical code 300, a low pass filter may be needed when a high-resolution image of multiresolution optical code 300 is obtained to remove the unexpected edges and automatic contrast stretching may be required to correct the greyness effects. By applying one or more levels of low pass filtering and/or performing automatic contrast stretching, multiresolution optical code 300 can be turned into multiresolution optical code 310 as shown in FIG. 3B. While multiresolution optical code 310 contains some blurry edges compared to example QR code 100, it is now substantially more visually similar than multiresolution optical code 300 and easily decoded by any standard QR code reader.

Figure 4A:
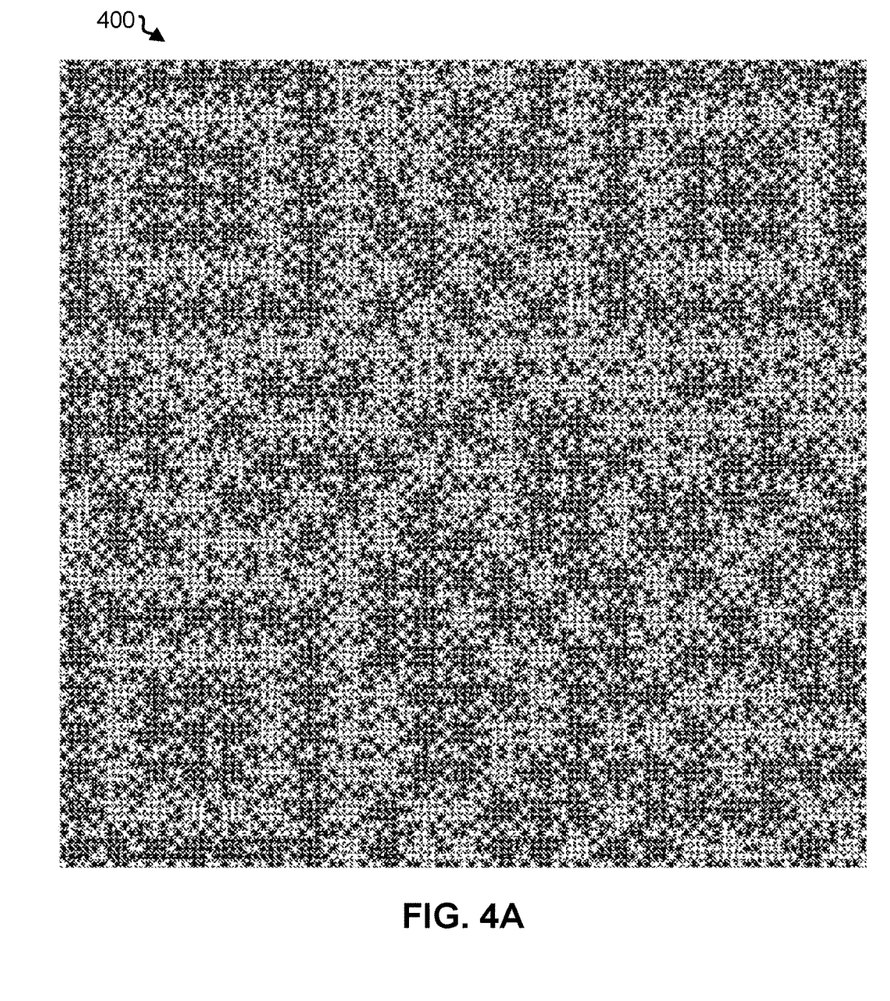
FIG. 4A depicts an example multiresolution optical code with three levels of resolution, in accordance with embodiments of the present disclosure.

FIG. 4A depicts an example multiresolution optical code 400 with three levels of resolution, in accordance with embodiments of the present disclosure. Multiresolution optical code 400 is the example QR code 100 from FIG. 1 (which encodes the string "basic content") with second and third levels of data encoded into each dot of example QR code 100. As presented here, the second level data encoded into multiresolution optical code 400 is a series of random 0s and 1s encoded into 5 by 5 matrices of sub-dots for each dot, and the third level data is a second series of random 0s and 1s encoded into 5 by 5 matrices of sub-dots for each of the border sub-dots of the second level data and is provided for example purposes only. Stated differently, multiresolution optical code 400 is multiresolution optical code 300 of FIG. 3A with a third level of encoding applied. As with multiresolution optical code 300, a comparison of multiresolution optical code 400 and example QR code 100 yields that multiresolution optical code 400 is visually similar to example QR code 100, especially if viewed from a distance; however, one can also see that there is a significant amount of additional detail, that being sub-dots on the borders of the original dots, with further sub-dots on the borders of those sub-dots. Multiresolution optical code 400 can be obtained from example QR code 100 by performing method 200 of FIG. 2 using the series of random 0s and 1s as the second level data to be encoded, with A and B each being 5 for a 5 by 5 matrix of sub-dots for each dot, using the second series of random 0s and 1s as the third level data, and with C and D each being 5 for a 5 by 5 matrix of sub-dots for each border sub-dot.

In a similar fashion as multiresolution optical code 300 containing 3528 bits of additional information beyond that of the original payload "basic content" of 104 bits, multiresolution optical code 400 contains 8 bits of information for each of the 3528 bits, for an additional 28,224 bits of information. As such, each additional level of information encoded into an optical code using the teachings presented herein can include an exponential increase in information encoded. Full decoding of multiresolution optical code 400 (each of the first level data, second level data, and third level data) can occur if an image can be obtained with 25 times the minimum resolution required to decode the original example QR code 100 (so as to be able to individually distinguish each sub-dot in the 5 by 5 matrices of the sub-dots of the 5 by 5 matrices).

Figure 4B:
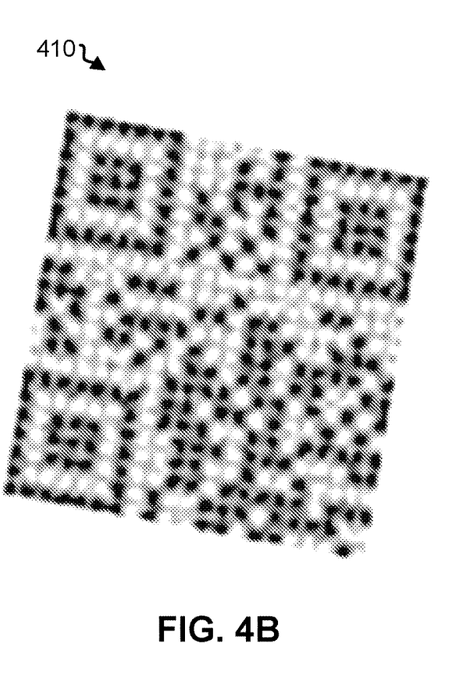
FIG. 4B depicts an example multiresolution optical code with three levels of resolution after image adjustments have been applied, in accordance with embodiments of the present disclosure.

FIG. 4B depicts an example multiresolution optical code 410 with three levels of resolution after image adjustments have been applied, in accordance with embodiments of the present disclosure. As with FIG. 3B, in order to decode the first level content of multiresolution optical code 400, a low pass filter may be needed when a high-resolution image of multiresolution optical code 400 is obtained to remove the unexpected edges and automatic contrast stretching may be required to correct the greyness effects. By applying one or more levels of low pass filtering and/or performing automatic contrast stretching, multiresolution optical code 400 can be turned into multiresolution optical code 410 as shown in FIG. 4B. A stronger low pass filter may be required compared to that used for multiresolution optical code 300. This can be due to the further lowering of the black content of the black dots (to 56.5% black and 43.5% white) and the white content of the white dots (to 56.5% white and 43.5% black), the black dots can appear dark grey and the white dots can appear light grey. While multiresolution optical code 410 contains some blurry edges compared to example QR code 100, it is now substantially more visually similar than multiresolution optical code 400 and easily decoded by any standard QR code reader.

For an example of the increase in information storable in example QR code 100, multiresolution optical code 300, and multiresolution optical code 400, the following lorem ipsum placeholder text is provided.

First level: Lorem ipsum.

Second level: Lorem ipsum dolor sit amet, rebum salutatus ut est, id sed vocibus vituperata delicatissimi. Has decore theophrastus ex. Detracto invenire at quo, ei nulla nonumy consequat sed, ex duo nonumy ubique sadipscing. Mea eu placerat splendide, per ea laboramus intellegebat, vel labores laoreet patrioque in. In cibo magna aliquam vim, te timeam indoctum quo. Alia nemore necessitatibus at mei, mel ei zril alterum voluptua, choro evertitur sed id. Vim lorem.

Third level: Lorem ipsum dolor sit amet, rebum salutatus ut est, id sed vocibus vituperata delicatissimi. Has decore theophrastus ex. Detracto invenire at quo, ei nulla nonumy consequat sed, ex duo nonumy ubique sadipscing. Mea eu placerat splendide, per ea laboramus intellegebat, vel labores laoreet patrioque in. In cibo magna aliquam vim, te timeam indoctum quo. Alia nemore necessitatibus at mei, mel ei zril alterum voluptua, choro evertitur sed id. Vim lorem iriure fierent te, et est veniam debitis, oratio omittantur ei mei. Eu eum dictas vivendo, ex homero omittantur nec. Pri petentium honestatis instructior an, at luptatum insolens repudiandae per. Id posse nullam commune vel, qui cu eirmod regione evertitur. Nihil scriptorem referrentur ea sea, minim aperiri intellegat in cum. Ne sea eros altera semper, cu autem delenit eligendi quo. Usu malorum persius vocibus et. Numquam partiendo at vis, docendi consulatu iracundia an eum. Mei ad ignota commodo splendide, at movet virtute diceret mel. Odio dico animal sit ex, in habeo quaeque vis. Ius no inani sonet utamur. Bonorum atomorum ne mei, an sit purto aeque zril, dolores consequat cu qui. Duo ut munere scaevola suavitate. His propriae eligendi vivendum no. Inani saperet consequat no est, cu novum ponderum expetendis his, id eos diam autem aliquando. Mutat justo aliquid eum no, ne eum mazim maiestatis voluptatum. Pri assum tacimates splendide ut. Ea vix euripidis adversarium reprehendunt. Explicari persequeris sea te. Eos facer periculis erroribus an, at nibh tincidunt conceptam vis. Sit movet tempor scribentur ad, dicunt argumentum definitionem an pro, et has stet facilisi. Dicant perpetua est cu, interesset neglegentur qui et. Ius virtute vituperatoribus cu, vis dicant reformidans contentiones id, mea cu probo prompta diceret. In tale oporteat honestatis vix, usu laudem deleniti appetere te. In ius partiendo consequuntur, an nam feugait vivendo. Quod invenire reprimique no sed, te audiam erroribus mel. Aperiam laboramus adipiscing ex pro, quando intellegebat mea an, vel in vitae percipit vituperatoribus. Eam ex stet maiestatis deterruisset, per accusam insolens ne. Reque argumentum instructior no his, vim ipsum nemore an. No sit amet posse omnium, te cum choro soleat, et movet homero officiis usu. Et mel laudem convenire, laoreet inciderint no per, duo id laboramus persecuti. Nam legere audire voluptatum ut. Purto dicam mel ea, vim nostrud vivendo principes an. Id ius labitur commune. Id partiendo vulputate qui. Ne duo prima labores contentiones, nec ei justo honestatis, eos modo apeirian ad. Vix et quot mutat, at quis postea conclusionemque pri, ex nullam accusata eum. Ea vocibus phaedrum his, sit malorum invenire disputationi eu. Qui an aliquid delectus theophrastus, no sed ignota volutpat consulatu, debet corpora vel ea. Quis enim maluisset nec ex, et sit scripta eligendi, saepe iisque debitis vel ex. Tale tota regione vel ut, cu maiorum posidonium elaboraret nam. Duo id honestatis intellegebat, duo ferri vulputate ad, vel ea graece molestie signiferumque. Alia aeterno necessitatibus pro ut. Commodo detracto gubergren an has, eos graece integre cu. Sed id idque explicari, mel legimus recusabo delicatissimi cu. Sea ex erant dicunt deserunt, sea ea mundi deserunt euripidis, vix at modus ullamcorper. Quo alia labitur propriae ne, pri id mazim qualisque. Senserit sadipscing id mel, posse nullam salutatus id sit. At ludus veniam petentium est, fastidii lucilius nec ea, ex sit saepe decore suscipit. Eu usu adhuc suscipit dissentiet, ei cum vivendo pertinax. Unum contentiones his no, ad his ferri temporibus dissentiunt. Nam aeque vivendum ocurreret no, magna essent splendide ea pro. Cu vivendum ocurreret duo, sed urbanitas scripserit disputationi ne, vidit ceteros lobortis vix ad. Ex erant sententiae sea. Vitae timeam eam id, to cibo maiorum democritum quo. An vix stet percipit, nostrum placerat consetetur eos ut. Nam id postea saperet dolorum, et hinc quidam aet.

Figure 5:
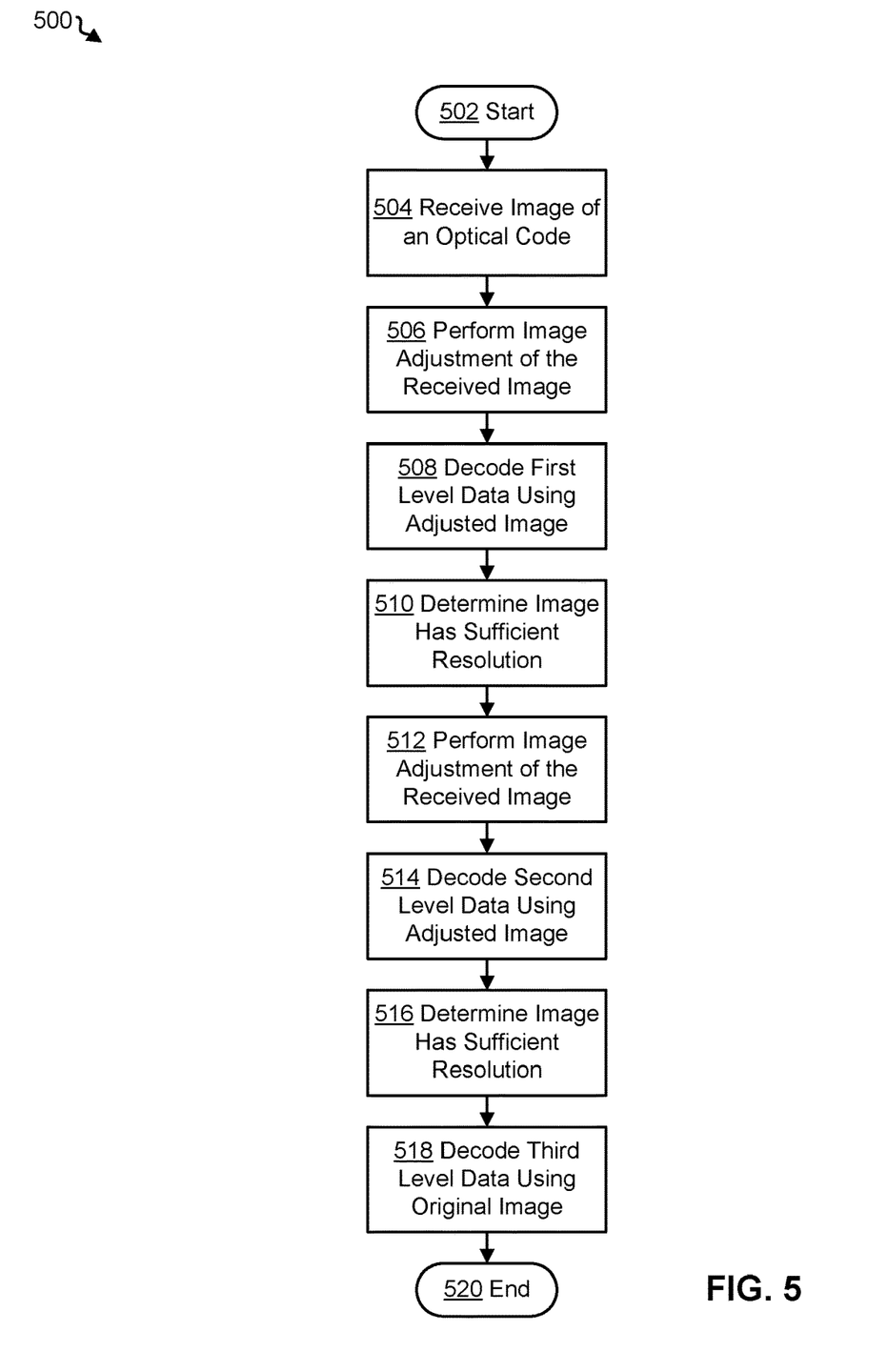
FIG. 5 depicts an example method for decoding a multiresolution optical code, in accordance with embodiments of the present disclosure.

FIG. 5 depicts an example method 500 for decoding a multiresolution optical code, in accordance with embodiments of the present disclosure. Method 500 can include more or fewer operations than those depicted. Method 500 can include operations in different orders than those depicted. In some embodiments, method 500 can be performed using a computer system (such as computer system 600 depicted in FIG. 6) running an optical code application. In the example of method 500, a multiresolution optical code with three levels of information is discussed. If only two levels of information are included, operations 510-516 can be omitted, whereas if four or more levels of information are included, operations 510-516 can be repeated as many times as appropriate.

Method 500 beings at start 502 and proceeds to operation 504 where an image of an optical code is received. Receipt of an image of an optical code can occur when a photograph is taken of an optical code, when an optical code is scanned by a code reader, or an image of an optical code is otherwise received.

Once an image of an optical code is received, method 500 proceeds to operation 506 to perform image adjustment of the received image. In some embodiments, operation 506 may be unnecessary. This may be the case if the image received at operation 504 is of low resolution, was taken from far away, or is otherwise of low quality. In such cases, only the first level of information encoded in the optical code may be decipherable and may be able to be done without image adjustment. If the image received at operation 504 is of higher resolution, was taken from closer to the optical code, or is otherwise of higher quality, image adjustment may be needed to decode the first level of information. In order to decode the first level data from an optical code created using the teachings of the present disclosure (such as one created by performing method 200 of FIG. 2, which may be in a form similar to multiresolution optical code 300 of FIG. 3A or multiresolution optical code 400 of FIG. 4A), a low pass filter may be needed to remove the unexpected edges introduced by the sub-dots on the borders of dots. Automatic contrast stretching may also be required to correct the greyness effects where a black dot has had white sub-dots introduced and vice versa. In some embodiments, multiple levels of low pass filtering and/or automatic contrast stretching may be applied in order to yield a version of the received optical image which can be decoded. This could occur e.g., by attempting a first level of low pass filtering, attempting to decode the first level data in operation 508 below, and if unsuccessful, returning to operation 506 to apply a second level of low pass filtering. The result of operation 506 may have appearance matching or similar to multiresolution optical code 310 of FIG. 3B or multiresolution optical code 410 of FIG. 4B. The modification performed at operation 506 can preserve the low frequency content of the bidimensional Fourier transform of the image.

At operation 508, decoding the first level data can be performed using the adjusted image resulting from operation 506. This may be performed using any known method for decoding an optical image in the format which corresponds to the received optical image. For example, if the received image is of a QR code, or a multiresolution optical code based on a QR code (e.g., the first level data is in the form of a QR code, but this code has been modified using method 200 of FIG. 2), standard techniques for decoding a QR code can be performed on the adjusted image.

At operation 510, it can be determined that the original image received at operation 504 has sufficient resolution for further decoding. For example, the multiresolution optical code 300 of FIG. 3A utilized matrices of 5 by 5 sub-dots, and as such in order to decode the information contained within the second level, a resolution of 5 times that required for example QR code 100 of FIG. 1 would be required. The determining the original image received at operation 504 has sufficient resolution for further decoding can comprise determining the sub-dots present in the original image are individually distinguishable. If instead there is insufficient resolution, method 500 ends.

At operation 512, method 500 performs image adjustment of the received image. Operation 512 can be substantially similar to that performed in operation 506 and can include applying one or more levels of low pass filtering and/or automatic contrast stretching may be applied in order to yield a version of the received optical image in which the second level information can be decoded. In order to obtain an adjusted image where the second level information remains and is not smoothed away by the low pass filtering, a different level of low pass filtering can be required than that used in operation 506. In some embodiments, multiple levels of low pass filtering and/or automatic contrast stretching may be applied in order to yield a version of the received optical image which can be decoded. This could occur e.g., by attempting a third level of low pass filtering, attempting to decode the first level data in operation 514 below, and if unsuccessful, returning to operation 512 to apply a fourth level of low pass filtering. Additional forms of image adjustment may be used in embodiments, including usage of Fourier analysis to ensure alignment of the matrices of the image, such that the sub-dots can be appropriately identified.

At operation 514, the second level data is decoded using the adjusted image. This can include comparing luminescence of the sub-dots of each pair of sub-dots to determine one sub-dot is brighter (e.g., a white or light-colored) and the other darker (e.g., a black or dark-colored). Depending on the encoding algorithm used, a white dot followed by a black dot can represent a 0 or a 1, with the reverse (black dot followed by a white dot) representing a 1 or a 0 accordingly. By iterating this process for each pair of sub-dots for each dot in the optical code, a sequence of 1s and 0s can be identified and the second level information decoded.

At operation 516, it can be determined that the original image received at operation 504 has sufficient resolution for further decoding. For example, the multiresolution optical code 400 of FIG. 4A utilized matrices of 5 by 5 sub-dots, with the sub-dots in the border of those matrices further divided into 5 by 5 matrices, and as such in order to decode the information contained within the third level, a resolution of 25 times that required for example QR code 100 of FIG. 1 would be required. The determining the original image received at operation 504 has sufficient resolution for further decoding can comprise determining the sub-dots of the sub-dots present in the original image are individually distinguishable. If instead there is insufficient resolution, method 500 ends.

At operation 518, the third level data is decoded using the adjusted image. This can include comparing luminescence of the sub-dots of each pair of sub-dots to determine one sub-dot is brighter (e.g., a white or light color) and the other darker (e.g., a black or dark color). Depending on the encoding algorithm used, a white dot followed by a black dot can represent a 0 or a 1, with the reverse (black dot followed by a white dot) representing a 1 or a 0 accordingly. By iterating this process for each pair of sub-dots for each dot in the optical code, a sequence of 1s and 0s can be identified and the second level information decoded. Once the third level data is decoded, method 500 ends at 520.

Figure 6:
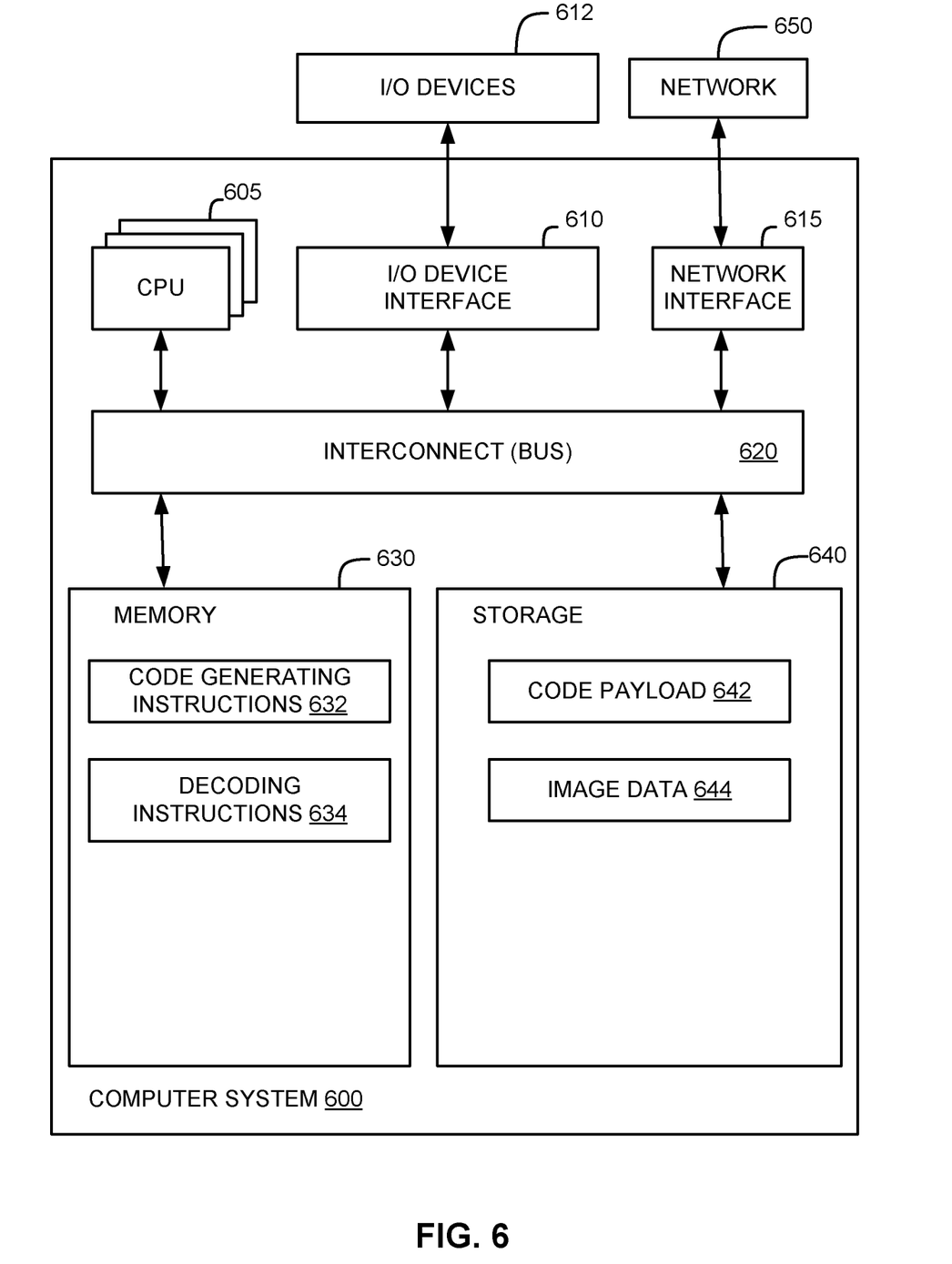
FIG. 6 illustrates a block diagram of a computer system, in accordance with embodiments of the present disclosure.

FIG. 6 illustrates a block diagram of a computer system 600, in accordance with some embodiments of the present disclosure. In some embodiments, computer system 600 performs operations in accordance with FIG. 1 as described above. The computer system 600 can include one or more processors 605 (also referred to herein as CPUs 605), an I/O device interface 610 which can be coupled to one or more I/O devices 612, a network interface 615, an interconnect (e.g., BUS) 620, a memory 630, and a storage 640.

In some embodiments, each CPU 605 can retrieve and execute programming instructions stored in the memory 630 or storage 640. The interconnect 620 can be used to move data, such as programming instructions, between the CPUs 605, I/O device interface 610, network interface 615, memory 630, and storage 640. The interconnect 620 can be implemented using one or more busses. Memory 630 is generally included to be representative of a random access memory (e.g., static random access memory (SRAM), dynamic random access memory (DRAM), or Flash).

In some embodiments, the memory 630 can be in the form of modules (e.g., dual in-line memory modules). The storage 640 is generally included to be representative of a non-volatile memory, such as a hard disk drive, solid state device (SSD), removable memory cards, optical storage, or flash memory devices. In an alternative embodiment, the storage 640 can be replaced by storage area-network (SAN) devices, the cloud, or other devices connected to the computer system 600 via the I/O devices 612 or a network 650 via the network interface 615.

The CPUs 605 can be a single CPU, multiple CPUs, a single CPU having multiple processing cores, or multiple CPUs with one or more of them having multiple processing cores in various embodiments. In some embodiments, a processor 605 can be a digital signal processor (DSP). The CPUs 605 can additionally include one or more memory buffers or caches (not depicted) that provide temporary storage of instructions and data for the CPUs 605. The CPUs 605 can be comprised of one or more circuits configured to perform one or more methods consistent with embodiments of the present disclosure.

The memory 630 of computer system 600 includes code generating instructions 632 and decoding instructions 634. In some embodiments, computer system 600 may include only one of code generating instructions 632 or decoding instructions 634, such as a code reader only containing decoding instructions 634. Code generating instructions 632 can be an application or compilation of computer instructions for generating multiresolution optical codes such as by performing method 200 of FIG. 2 discussed above. Code generating instructions 632 can be instructions for creating a first level optical code, dividing the dots of the first level code into matrices of sub-dots, and encoding data into pairs of sub-dots on the borders of the matrices.

Decoding instructions 634 can be an application or compilation of computer instructions for decoding multiresolution optical codes in accordance with method 500 of FIG. 5, discussed above. Decoding instructions 634 can include instructions for receipt of optical codes, performing image adjustment of optical codes including low pass filtering, automatic contrast stretching, and Fourier analysis, determining if images of optical codes are of sufficient contrast for decoding, and one or more algorithms for decoding multiresolution optical codes.

Storage 640 contains code payload 642 and image data 644. In some embodiments, computer system 600 may include only one of code payload 642 and image data 644, such as a code generating computer system only containing code payload 642. Code payload 642 can be information in any format suitable for inclusion into an optical code, including numeric data, alphanumeric data, binary data, or kanji character data. Code payload data 642 can be information to be encoded in an optical code or information decoded from an optical code. Code payload data 642 can include reference data and/or error correcting data to include in, or decoded from, an optical code.

Image data 644 can be a picture taken using a digital camera, scanning device, or other device for capturing optical codes. Image data can include original images of an optical code and/or adjusted images, such as images which have been obtained after one or more of a low pass filter, automatic contrast stretching, or Fourier analysis have been applied to an image of an optical code.

In some embodiments as discussed above, the memory 630 stores code generating instructions 632 and decoding instructions 634, and the storage 640 stores code payload 642 and image data 644. However, in various embodiments, each of the code generating instructions 632, decoding instructions 634, code payload 642, and image data 644 are stored partially in memory 630 and partially in storage 640, or they are stored entirely in memory 630 or entirely in storage 640, or they are accessed over a network 650 via the network interface 615.

In various embodiments, the I/O devices 612 can include an interface capable of presenting information and receiving input. For example, I/O devices 612 can receive input from a user and present information to a user and/or a device interacting with computer system 600. In some embodiments, I/O devices 612 include one or more cameras or optical sensors such as for photographing or otherwise collecting optical data for a QR code. In some embodiments, I/O devices 612 can include a display and/or an audio speaker for presenting information to a user of computer system 600.

The network 650 can connect (via a physical or wireless connection) the computer system 600 with other networks, and/or one or more devices that interact with the computer system.

Logic modules throughout the computer system 600—including but not limited to the memory 630, the CPUs 605, and the I/O device interface 610—can communicate failures and changes to one or more components to a hypervisor or operating system (not depicted). The hypervisor or the operating system can allocate the various resources available in the computer system 600 and track the location of data in memory 630 and of processes assigned to various CPUs 605. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A method for encoding a multiresolution optical code, the method comprising:
    receiving a first set of information and a second set of information to encode;
    generating an optical code that encodes the first set of information in a plurality of dots;
    dividing each dot of the plurality of dots into a matrix of a first number of sub-dots by a second number of sub-dots, wherein each of the first number and the second number are integers equal to or greater than three, and wherein this dividing creates a set of matrices of sub-dots; and
    identifying a plurality of pairs of sub-dots, each pairs of sub-dots being located on a border of a matrix of the set of matrices; and
    encoding the second set of information in the pairs of sub-dots by changing a color of one sub-dot in each pair of sub-dots.

2. The method of claim 1, wherein generating the optical code that encodes the first set of information in the plurality of dots comprises encoding the first set of information in a plurality of light-colored dots and a plurality of dark-colored dots.

3. The method of claim 1, wherein encoding the second set of information in the pairs of sub-dots by changing the color of one sub-dot in each pair of sub-dots comprises altering the pairs of sub-dots such that pairs of sub-dots which are a dark-colored sub-dot followed by a light-colored sub-dot represents a bit selected from the group consisting of 0 and 1, and a light-colored sub-dot followed by a dark-colored sub-dot represents a bit selected from the group consisting of 0 and 1 which is different from the bit selected for the dark-colored sub-dot followed by the light-colored sub-dot.

4. The method of claim 1, further comprising:
    receiving a third set of information to encode in the optical code;
    dividing each of one or more of the plurality of pairs of sub-dots into a matrix of a third number of sub-dots by a fourth number of sub-dots; wherein each of the third number and the fourth number are integers equal to or greater than three;
    identifying a second plurality of pairs of sub-dots, the pairs of sub-dots of the second plurality of pairs of sub-dots being located on a border of each of the matrices of the third number of sub-dots by the fourth number of sub-dots; and
    encoding the third set of information in the second plurality of pairs of sub-dots by changing a color of one sub-dot in each pair of sub-dots.

5. The method of claim 1, wherein encoding the second set of information in the pairs of sub-dots is performed such that each of the pairs of sub-dots located on the border of each of the matrices each encodes a binary bit of the second set of information.

6. The method of claim 1, wherein the optical code that encodes the first set of information in the plurality of dots is a Quick Response (QR) code.

7. A system for encoding a multiresolution optical code, the system comprising:
    one or more processors; and
    a memory communicatively coupled to the one or more processors,
    wherein the memory comprises instructions which, when executed by the one or more processors, cause the one or more processors to perform a method comprising:
        receiving a first set of information and a second set of information to encode in an optical code;
        generating an optical code that encodes the first set of information in a plurality of dots;
        dividing each dot of the plurality of dots into a matrix of a first number of sub-dots by a second number of sub-dots, wherein each of the first number and the second number are integers equal to or greater than three and wherein this dividing creates a set of matrices of sub-dots; and
        encoding the second set of information in a plurality of the sub-dots of the set of matrices of sub-dots, wherein encoding the second set of information in the plurality of the sub-dots of the set of matrices of sub-dots further comprises:
    identifying a plurality of pairs of sub-dots, the pairs of sub-dots being located on a border of each of the matrices of the set of matrices; and
    encoding the second set of information in the pairs of sub-dots by changing a color of one sub-dot in each pair of sub-dots.

8. The system of claim 7, wherein generating the optical code that encodes the first set of information in the plurality of dots comprises encoding the first set of information in a plurality of light-colored dots and a plurality of dark-colored dots.

9. The system of claim 7, wherein encoding the second set of information in the pairs of sub-dots by changing the color of one sub-dot in each pair of sub-dots comprises:
    altering the pairs of sub-dots such that pairs of sub-dots which are a dark-colored sub-dot followed by a light-colored sub-dot represents a first binary value and a light-colored sub-dot followed by a dark-colored sub-dot represents a second binary value that is different from the first binary value.

10. The system of claim 7, further comprising:
    receiving a third set of information to encode in the optical code;
    dividing each of one or more of the plurality of pairs of sub-dots into a matrix of a third number of sub-dots by a fourth number of sub-dots; wherein each of the third number and the fourth number are integers equal to or greater than three;
    identifying a second plurality of pairs of sub-dots, the pairs of sub-dots of the second plurality of pairs of sub-dots being located on a border of each of the matrices of the third number of sub-dots by the fourth number of sub-dots; and
    encoding the third set of information in the second plurality of pairs of sub-dots by changing a color of one sub-dot in each pair of sub-dots.

11. The system of claim 7, wherein encoding the second set of information in the pairs of sub-dots is performed such that each of the pairs of sub-dots located on the border of each of the matrices each encodes a binary bit of the second set of information.

12. The system of claim 7, wherein the optical code that encodes the first set of information in the plurality of dots is a Quick Response (QR) code.

13. A computer program product for encoding a multi-resolution optical code, the computer program product comprising a computer readable storage medium having program instructions embodied therewith, the program instructions executable by a computer to perform a method comprising:
    receiving a first set of information and a second set of information to encode;
    generating an optical code that encodes the first set of information in a plurality of dots;
    dividing each dot of the plurality of dots into an M-by-N matrix, wherein M and N are integers equal to or greater than three, and wherein this dividing creates a set of M-by-N matrices of sub-dots;
    identifying pairs of sub-dots located along a border of an M-by-N matrix in the set of M-by-N matrices; and
    encoding the second set of information in the pairs of sub-dots by changing a color of one sub-dot in each pair of sub-dots.

14. The computer program product of claim 13, wherein generating the optical code that encodes the first set of information in the plurality of dots comprises encoding the first set of information in a plurality of light-colored dots and a plurality of dark-colored dots.

15. The computer program product of claim 13, further comprising:
    receiving a third set of information to encode in the optical code;
    dividing each M-by-N matrix into an A-by-B matrix, wherein A and B are integers equal to or greater than three;
    identifying a set of pairs of sub-dots located on a border of an A-by-B matrix; and
    encoding the third set of information in the set of pairs of sub-dots.

16. The computer program product of claim 13, wherein encoding the second set of information in the pairs of sub-dots is performed such that each of the pairs of sub-dots located on the border of each of the matrices each encodes a binary bit of the second set of information.

17. The computer program product of claim 13, wherein each M-by-N matrix comprises a center region of sub-dots, and wherein a color of the sub-dots in the center region of sub-dots is not changed during the encoding of the second set of information.

18. The computer program product of claim 13, wherein identifying the pairs of sub-dots includes identifying a starting sub-dot and a direction.

19. The computer program product of claim 18, wherein the starting sub-dot is at a corner of the associated M-by-N matrix, and wherein the direction is selected from the group consisting of clockwise and counterclockwise.

20. The computer program product of claim 13, wherein each pair of sub-dots encodes a single bit of information.

* * * * *